United States Patent
Langille et al.

(10) Patent No.: US 11,647,708 B2
(45) Date of Patent: May 16, 2023

(54) VERTICAL HYDROPONIC SYSTEM

(71) Applicant: Harvest Today LLC, Lafayette, CO (US)

(72) Inventors: Richard Langille, Lafayette, CO (US); Gregory Daryll Whiteside, London (CA); Joseph L. Kapushion, Westminster, CO (US)

(73) Assignee: HARVEST TODAY LLC, Colorado (CO)

( * ) Notice: Subject to any disclaimer, the term of this patent is extended or adjusted under 35 U.S.C. 154(b) by 0 days.

(21) Appl. No.: 17/233,914

(22) Filed: Apr. 19, 2021

(65) Prior Publication Data
US 2022/0330504 A1    Oct. 20, 2022

(51) Int. Cl.
*A01G 31/06*    (2006.01)
*A01G 27/00*    (2006.01)

(52) U.S. Cl.
CPC ........... *A01G 31/06* (2013.01); *A01G 27/005* (2013.01)

(58) Field of Classification Search
CPC ........ A01G 31/00; A01G 31/02; A01G 31/06; A01G 27/001; A01G 27/003; A01G 27/005
See application file for complete search history.

(56) References Cited

U.S. PATENT DOCUMENTS

| | | | |
|---|---|---|---|
| 7,080,482 B1 | 7/2006 | Bradley | |
| 8,250,804 B2 * | 8/2012 | Chang | A01G 9/025 47/65.9 |
| 8,966,819 B1 * | 3/2015 | Cosmann | A01G 9/023 47/83 |
| 9,359,759 B2 | 6/2016 | Lopez Otamendi | |

(Continued)

FOREIGN PATENT DOCUMENTS

| | | |
|---|---|---|
| CN | 104067878 A | * 10/2014 |
| CN | 105052605 A | * 11/2015 |

(Continued)

*Primary Examiner* — Magdalena Topolski
*Assistant Examiner* — Katherine Anne Kloecker
(74) *Attorney, Agent, or Firm* — Huw R. Jones; Jones IP Law LLC

(57) ABSTRACT

An embodiment of the novel and inventive vertical hydroponic system comprises a double-sided system, each side having two sets of double-door tile panels. Each door is mounted on hinges attached at either the right or left sides of an external support frame with the doors opening out from the middle. Each door in this embodiment may support a 6×4 array of novel and inventive tiles, each tile arranged with two columns of 3 pot supports, each such tile capable of supporting 6 grow pots, for a total of 144 grow pots per door. In this embodiment all four doors can support up to 576 grow pots. However, an infinite number of tile variations are possible with the 2×3 array being just one. The doors can be opened during the growth cycle without disconnecting or interrupting the irrigation components (Continued)

which allows for fast and easy harvesting and maintenance. A submersible pump and its control electronics are mounted in the support framework so the system is self-contained. Scheduling software is provided via digital mobile app, which is downloadable from common app sources. The hydroponic system is interconnectible to the internet for remote maintenance and monitoring.

18 Claims, 15 Drawing Sheets

(56) References Cited

U.S. PATENT DOCUMENTS

| | | | | |
|---|---|---|---|---|
| 10,477,786 | B1* | 11/2019 | Wilson | A01G 9/042 |
| 2011/0154744 | A1* | 6/2011 | Bowen | A01G 9/025 |
| | | | | 52/27 |
| 2014/0000163 | A1* | 1/2014 | Lin | A01G 31/02 |
| | | | | 47/62 R |
| 2015/0121756 | A1 | 5/2015 | Dos Santos | |
| 2016/0066525 | A1 | 3/2016 | Duquesnay et al. | |
| 2017/0142912 | A1* | 5/2017 | Gasmer | A01G 9/083 |
| 2018/0035626 | A1* | 2/2018 | Bailey | A01G 31/06 |
| 2020/0128761 | A1* | 4/2020 | Kincaid | A01G 9/24 |
| 2020/0236878 | A1* | 7/2020 | Millar | F04B 49/065 |
| 2020/0383277 | A1 | 12/2020 | Tyink | |
| 2020/0396917 | A1 | 12/2020 | Olesen et al. | |
| 2021/0212276 | A1 | 7/2021 | Hersh | |

FOREIGN PATENT DOCUMENTS

| | | | | |
|---|---|---|---|---|
| CN | 110268968 A | * | 9/2019 | A01G 27/003 |
| CN | 110463466 A | * | 11/2019 | |
| EP | 3533319 A1 | | 9/2019 | |
| KR | 101433598 B1 | * | 2/2014 | |
| WO | 2017185116 A1 | | 11/2017 | |

* cited by examiner

VERTICAL HYDROPONIC SYSTEM

BACKGROUND

Hydroponics is a type of horticulture and a subset of hydroculture, which is a method of growing plants without soil by using mineral nutrient solutions in an aqueous solvent. Terrestrial plants may be grown with only their roots exposed to the nutritious liquid or the roots may be physically supported by an inert medium such as perlite, gravel, coconut coir or other substrates. The nutrients used in hydroponic systems can come from many different sources, including (but not limited to) fish excrement, duck manure, purchased chemical fertilizers, or artificial nutrient solutions. Hydroponics offers many advantages, one of them being a decrease in water usage for agriculture. To grow 1 kilogram (2.2 lb) of tomatoes using intensive farming methods requires 400 liters (88 imp gal; 110 U.S. gal) of water; using hydroponics, 70 liters (15 imp gal; 18 U.S. gal); and only 20 liters (4.4 imp gal; 5.3 U.S. gal) using aeroponics (Zhang, He et al., "Implementing Vertical Farming at University Scale to Promote Sustainable Communities: A Feasibility Analysis". Sustainability 10 (12): 4429 (Nov. 27, 2018)). Since it takes much less water to grow produce, it could be possible in the future for providers in harsh environments with little accessible water to grow their own food.

Aeroponics, on the other hand, is a relatively new invention and is characterized mainly by the lack of continuous root exposure to water, but instead the roots are maintained in air and only infrequently watered, usually with a water vapor or mist containing the fertilizers and other nutrients needed for growth. The method does not require a growth substrate. Aeroponic techniques have proven to be commercially successful for propagation, seed germination, seed potato production, tomato production, leaf crops, and microgreens. Since inventor Richard Stoner commercialized aeroponic technology in 1983, aeroponics has been implemented as an alternative to water intensive hydroponic systems worldwide (Stoner, R. J. "Aeroponics Versus Bed and Hydroponic Propagation," Florists' Review 173:4477 (Sep. 22, 1983)—via AgriHouse). The limitation of hydroponics is that certain species of plants can only survive for so long in water before they become waterlogged. The advantage of aeroponics is that suspended aeroponic plants receive 100% of the available oxygen and carbon dioxide to the roots zone, stems, and leaves thus accelerating biomass growth and reducing rooting times. NASA research has shown that aeroponically grown plants have an 80% increase in dry weight biomass (essential minerals) compared to hydroponically grown plants. Aeroponics used 65% less water than hydroponics. NASA also concluded that aeroponically grown plants require one quarter the nutrient input compared to hydroponics (NASA "Progressive Plant Growing Has Business Blooming" (PDF). 2006 Spinoff. NASA Center for AeroSpace information (CAST): 64-67; Ritter, E., et al., "Comparison of hydroponic and aeroponic cultivation systems for the production of potato minitubers", Potato Research. 44 (2): 127-135 (2001)). Unlike by grown plants, aeroponically grown plants will not suffer transplant shock when transplanted to soil, and offers growers the ability to reduce the spread of disease and pathogens.

Both hydroponic and aeroponic systems are relatively new to large-scale commercial agriculture. Hydroponic systems typically utilize horizontal baths where plants are above the water with strict attention given to maintaining the roots partially in water, but not so much as to become waterlogged. No growing substrate is required in hydroponic agriculture. The water is either actively circulated ("continuous flow solution culture") or not ("static solution culture"). Aeroponic support systems have no such horizontal limitation due to there being no need to maintain a horizontal bath. The primary aeroponic system design criteria is that the roots be made available for misting or spraying the water whenever required, and so can be arranged vertically to take advantage of space limitations. One such example is the Tower Garden® Vertical Aeroponic Growing System. However, such systems suffer from a lack of adaptability in terms of modifying and expanding their capacity. There is a continuing need for more flexible and efficient aeroponic/hydroponic growing systems.

BRIEF SUMMARY OF THE INVENTION

Embodiments of the invention are directed to a tile for vertical hydroponic farming comprising a substrate having front and back surfaces forming a tile, the front surface oriented vertically when in use and having one or more pot supports for supporting grow pots, the pot support comprising an angled projection with an opening from the tile front surface adapted to support a grow pot inserted through the opening, the tile back surface comprising irrigation features that direct a flow of water in a vertical direction to and past the rear portion of the grow pots that project through the tile rear surface. The tile also has tile horizontal engagement features located on the edges of the tiles whereby the tiles may be releasably locked to other tiles in a 2-dimensional array resulting in a user-designable tile wall. The tile also includes vertical engagement features comprising an upper end and a lower end, the upper end comprising engagement features and upper straws, the lower end comprising engagement features and lower straws, the lower straws adapted to engage with the upper straws from another tile when individual tiles are vertically engaged. The vertical engagement features can comprise posts and sockets. The tile's angled projection is angled approximately 45 degrees from horizontal when the tile is oriented vertically.

Another embodiment of the invention is that the angled projection optionally comprises a lip on its front surface for restraining a grow pot from slipping through the opening.

Another embodiment of the invention is the tile previously described wherein the plurality of projections are centered on a vertical line thereby creating a column of grow pots.

Another embodiment of the invention is the tile previously described wherein the projections are arranged in a 2×3 array.

Another embodiment of the invention is the tile previously described wherein the projections are adapted to fit standard-sized commercial peat pots.

Another embodiment of the invention is the tile previously described wherein the projections are integral to the tile.

Another embodiment of the invention is the tile previously described wherein the upper straw directs water from the irrigation flood rail located directly above each column of grow pots to channels that direct the water to each grow pot when water is admitted from above.

Another embodiment of the invention is the tile previously described wherein the horizontal engagement features comprise integral keyholes, keys and locking tabs.

Another embodiment of the invention is a vertical hydroponic system comprising a plurality of the tiles described above arranged in a vertical hydroponic wall, further including a support frame defining the periphery of the hydroponic wall, the top frame rail comprising an irrigation flood rail having a plurality of water inlets, and the bottom rail comprising a primary reservoir for water that drains from above, and two side rails providing lateral rails for attaching tiles to the support frame. The hydroponic system also includes conduits for connecting the primary reservoir with the irrigation flood rail; pumping means for moving water from the primary reservoir to the irrigation flood rail; support means attached to and supporting the support frame in a freestanding condition; and automated pump control means for providing power to and control of a pump.

Another embodiment of the vertical hydroponic system is that the conduits connecting the primary reservoir with the irrigation flood rail comprise plastic tubing.

Another embodiment of the vertical hydroponic system is the irrigation flood rail comprises a secondary reservoir, a waterfall edge and a flood compartment.

Another embodiment of the vertical hydroponic system is wherein the waterfall edge comprises a ridge that separates the secondary reservoir from the flood compartment.

Another embodiment of the vertical hydroponic system is wherein the support means provides lateral stability to the frame in a direction perpendicular to the frame.

Another embodiment of the vertical hydroponic system is the automated pump control system comprises a computerized scheduler programmed to perform various hydroponic functions comprising watering at timed intervals, adding various fertilizers or nutrients to the water, detecting various chemicals in the water through sensors, and providing remote communication capability.

Another embodiment of the vertical hydroponic system is wherein the remote communication capability comprises a wireless connection to a mobile handheld computing device.

Another embodiment of the vertical hydroponic system is wherein the automated pump control means comprises an integrated circuit board comprising a power supply, two or more differently colored LEDs, a pump relay, float switch, WiFi-capable controller and a scheduler.

Another embodiment of the vertical hydroponic system wherein the automated pump control means wherein the scheduler comprises programmable code that resides in a mobile handheld computing device.

DETAILED DESCRIPTION OF THE INVENTION

Figure 1:
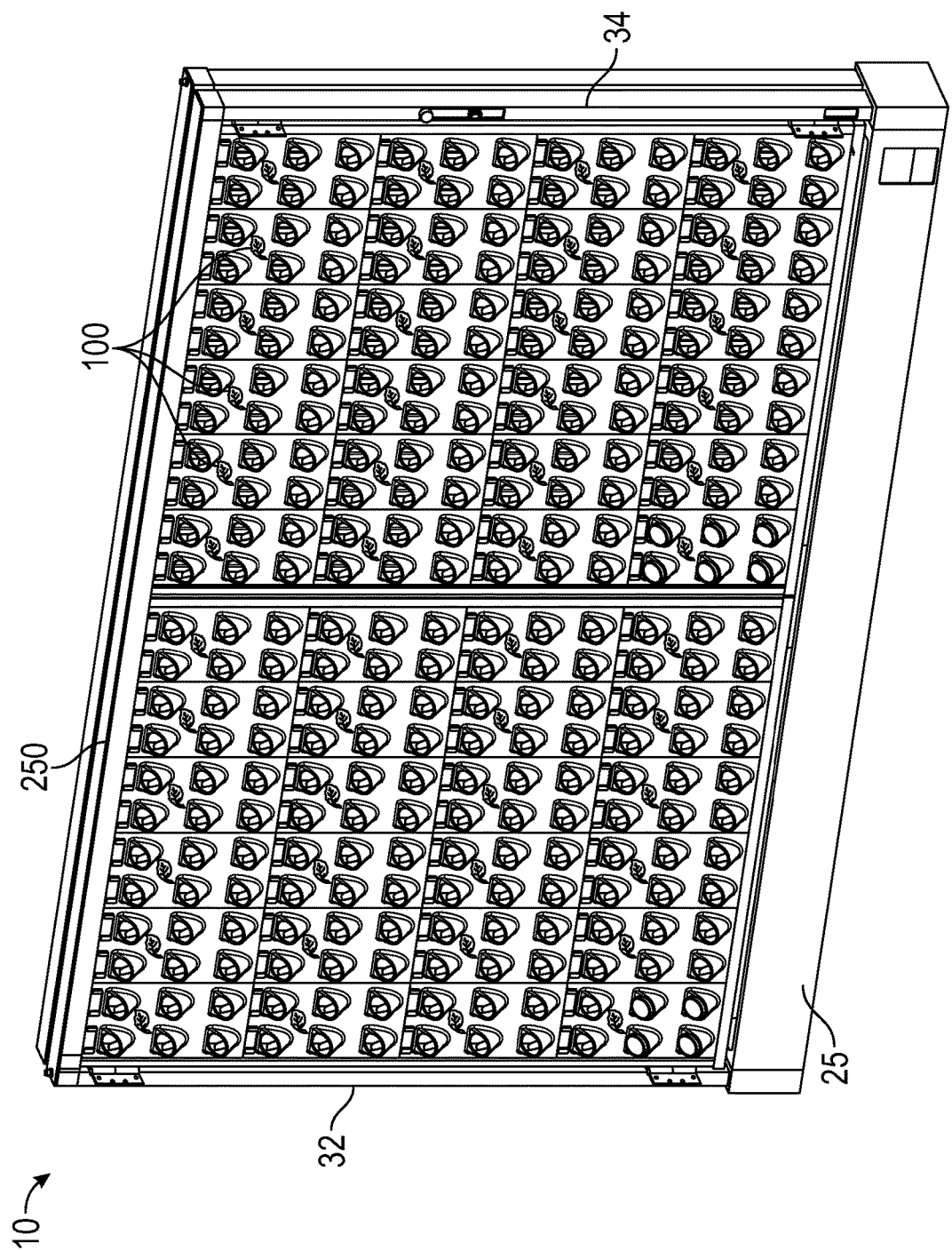
FIG. 1 is a computer-generated model of an isometric perspective view of a double-door double-sided embodiment of the vertical hydroponic system of the present invention.

"VERTIGATION™" is a combination of the words "vertical" and "irrigation." In a single word it describes the integration of vertical flow of water and irrigation of the grow pots in one gravity-fed irrigation design as currently presented.

An embodiment of the novel and inventive vertical hydroponic system comprises a double-sided system, each side having two sets of double-door tile panels. Each door is mounted on hinges attached at either the right or left sides of the external mounting frame with the doors opening out from the middle. Each door in this embodiment supports a 6×4 array of novel and inventive tiles, each tile arranged with two columns of 3 pot supports, each such tile capable of supporting 6 grow pots, for a total of 144 grow pots per door. In this embodiment all four doors can support up to 576 grow pots. However, an infinite number of tile variations are possible with the 2×3 array being just one. In addition, other embodiments varying the size, capacity and number of the doors and number of tiles are also possible, which further adds to the scalability of design. Further embodiments directed to a range of pot diameters are also within the scope of the invention. The doors can be opened during the growth cycle without disconnecting or interrupting the irrigation components which allows for fast and easy harvesting and maintenance. A submersible pump and its control electronics are mounted in the external framework so the system is self-contained. Scheduling software is provided via digital mobile app, which is downloadable from common app sources. In this embodiment lighting sources are not described but one of ordinary skill in the hydroponic arts will be able to supply and configure the lighting necessary for various grow configurations.

Embodiments of the invention are directed to a vertical hydroponic system comprising a plurality of novel tiles. Each tile comprises a substrate that has front and back surfaces, and when multiple tiles are joined together they form a wall of tiles. The front surface of each tile is oriented vertically when in use. Each tile may have one or more pot supports for supporting commercially-available grow pots, also known in the trade as a "JIFFYPOT®". The pot supports comprise angled projections with an opening in the tile wall front surface adapted to support a grow pot inserted through the opening.

Each tile additionally includes horizontal engagement features located on the edges of the tiles through which the tiles may be releasably locked to other tiles in a 2-dimensional array resulting in a scalable user-designable tile wall. This allows the user to customize the overall shape and size of the wall to fit the surrounding environment.

The tile back surface includes irrigation features that direct a flow of water in a vertical direction to and past the rear portion of the grow pots that project through the tile rear surface. In a first embodiment, tile irrigation features include an upper shelf and a lower shelf, the upper shelf comprising a front wall, rear wall and upper straws. Straws are water conduits that direct a water flow from above into the channels of the tile and then into the next adjacent shelf. The lower shelf also includes a front wall, rear wall and lower straws, the lower straws adapted to cooperate with the upper straws from an adjacent tile's upper shelf when individual tiles are stacked together vertically. The overall design of the tile enables a flexible tile wall design that eliminates the need to make and remake hydraulic connections when the user decides that the wall needs to be resized, removed or otherwise taken down.

In another embodiment the tile back surface comprises tile vertical engagement features comprising an upper end and a lower end, the upper end comprising engagement features and upper straws, the lower end comprising engagement features and lower straws, the lower straws adapted to engage with the upper straws from another tile when individual tiles are vertically engaged. The upper end engagement features include receivers, and the lower end engagement features are pegs.

Figure 2:
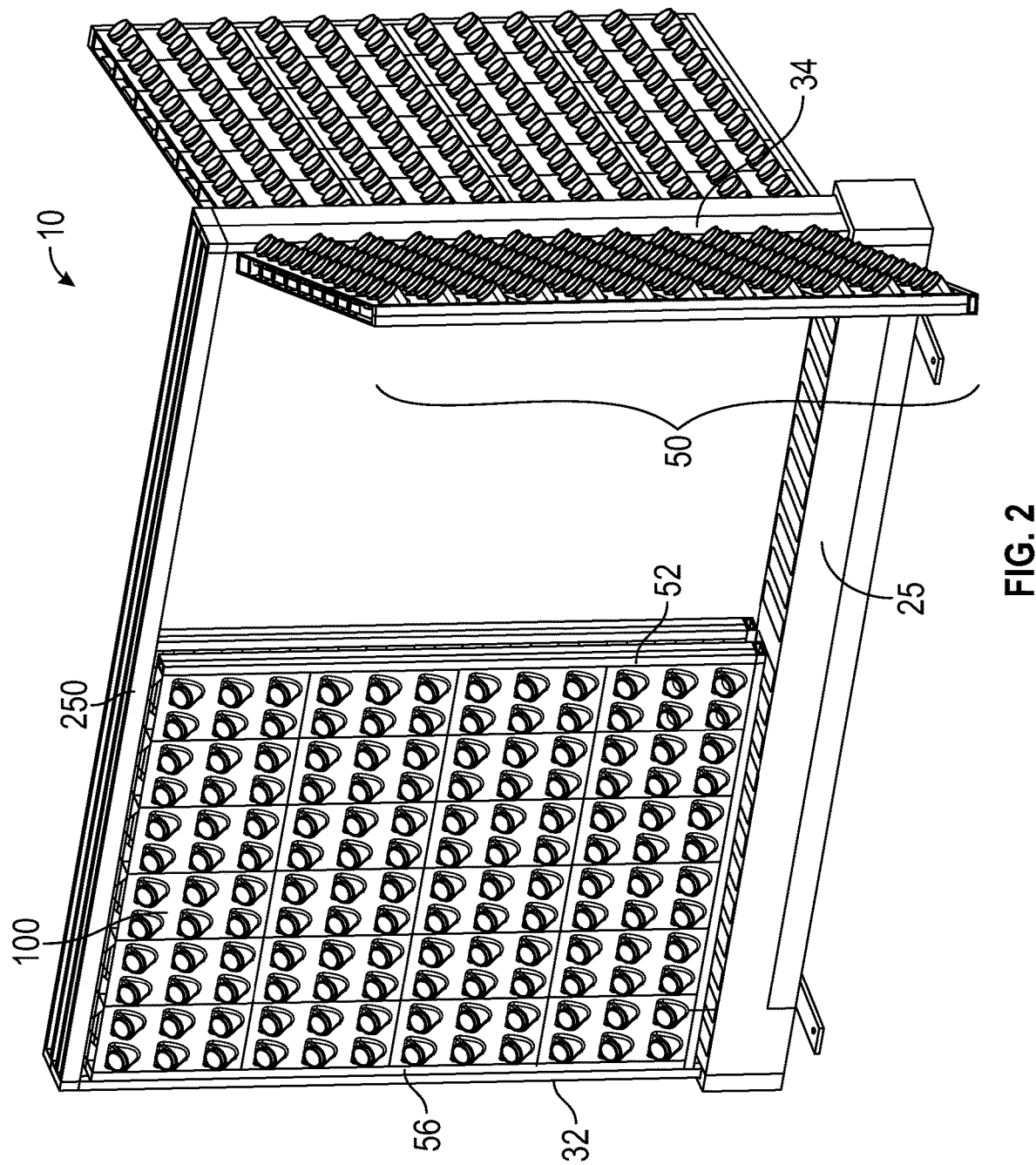
FIG. 2 is the isometric perspective view of FIG. 1 with two of the four doors opened and grow pots installed.

FIG. 1 is a computer-generated isometric view of an embodiment of the novel and inventive vertical hydroponic system 10. FIG. 1 shows a double-sided system, e.g., each side has a set of double-door tile panels. Each door comprises a three-sided door frame 50 with mounted tiles 100 and is hung on hinges attached at either the right or left sides of the support frame 20, with the doors opening out from the middle. In this embodiment each door frame 50 supports a 6×4 array of tiles, each tile capable of supporting 6 grow pots, for a total of 144 grow pots per door. All four doors can support up to 576 grow pots. FIG. 2 is the same isometric view with the right two doors opened and grow pots installed.

Figure 3:
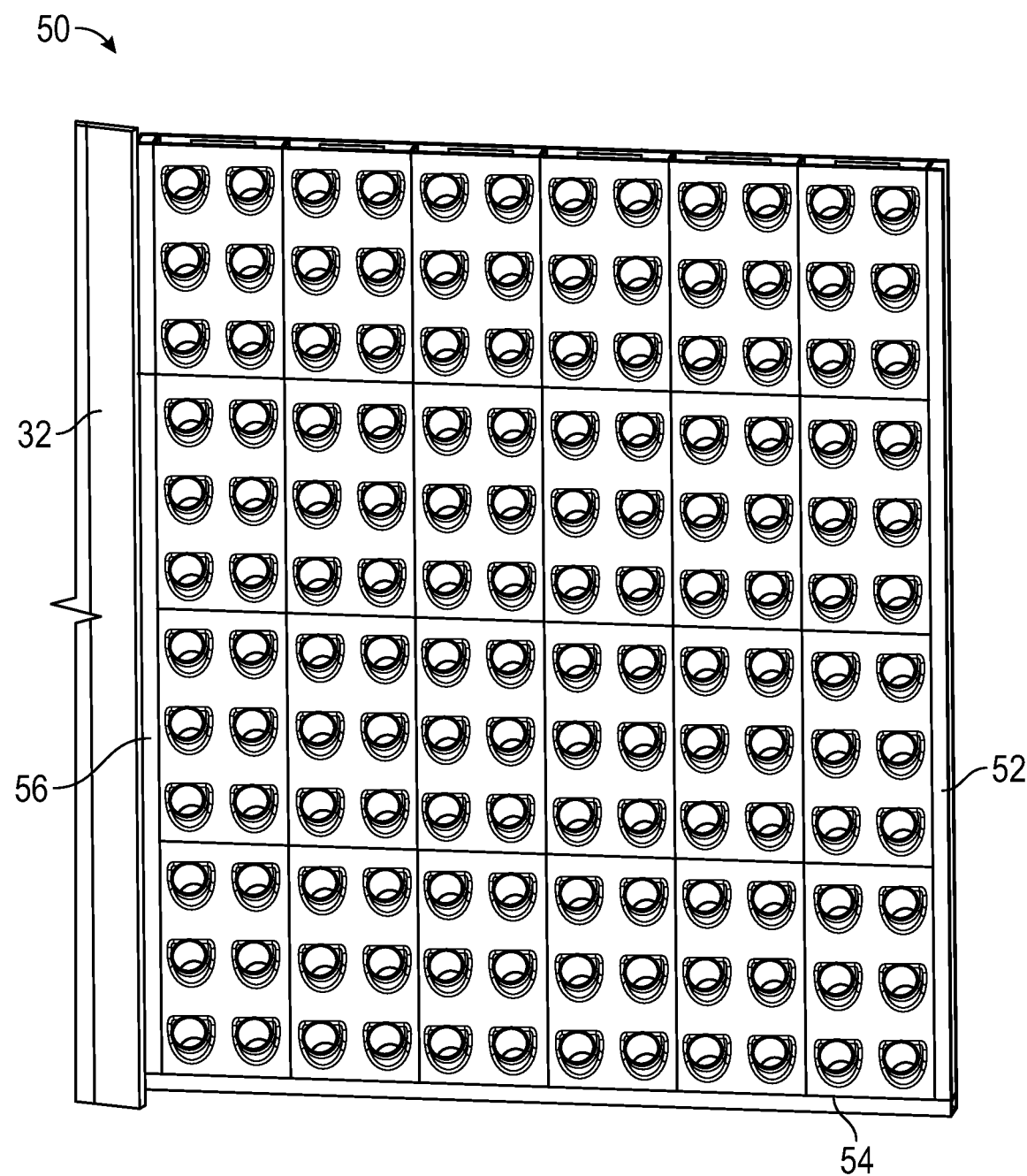
FIG. 3 is a front elevational perspective of a door of FIG. 2.

FIG. 3 is a front view of one of the opened doors of FIGS. 1-2. Door closing rail 52 is shown to the right; door bottom rail 54 is at the bottom and attaches at its ends to door closing rail 52 and door hinge rail 56. There is no top rail as the tiles interlock at their edges, and water is dripped from the irrigation flood rail 250 directly above the (closed) door into the uppermost row of tiles.

As previously described above, the support frame 20 that supports door frames 50 comprises edge components comprised of four rails: a bottom reservoir rail 25, left and right side rails 32, 34, respectively, and topmost irrigation flood rail 250. At the bottom of support frame 20 is reservoir rail 25, which may function as both a water reservoir and a support rail. It sits horizontally on either the floor, or on support feet (not shown) that laterally stabilize external frame 20. Reservoir rail 25 may also contain a submersible pump 300 and associated tubing for pumping water to the irrigation flood rail at the top of external frame 20. Side rails 32 and 34 provide lateral support for the doors, function as attachment points for the door hinges, housing for the automated pump electronics, and contain UV-shielded tubing pathways for water transfer. Side rails 32/34 connect to reservoir rail 25 at the lower corners using conventional means which are covered with end caps.

As previously described above, FIG. 3 depicts each door comprised of three side rails and a variable number of tiles 100. In order to attach tiles 100 to the doors, door closing rail 52 and door hinge rail 56 have keys and keyholes in their vertical inward-facing surfaces that mate with their opposite keyhole and key on the tile edges they are to be adjoined with. Door hinge rail 56 is adapted to accept one or more hinges, which in turn are hung upon a support frame rail. This allows the doors to be opened and closed during inter-irrigation periods for system servicing, harvesting or any other reason to open the doors.

Figure 4:
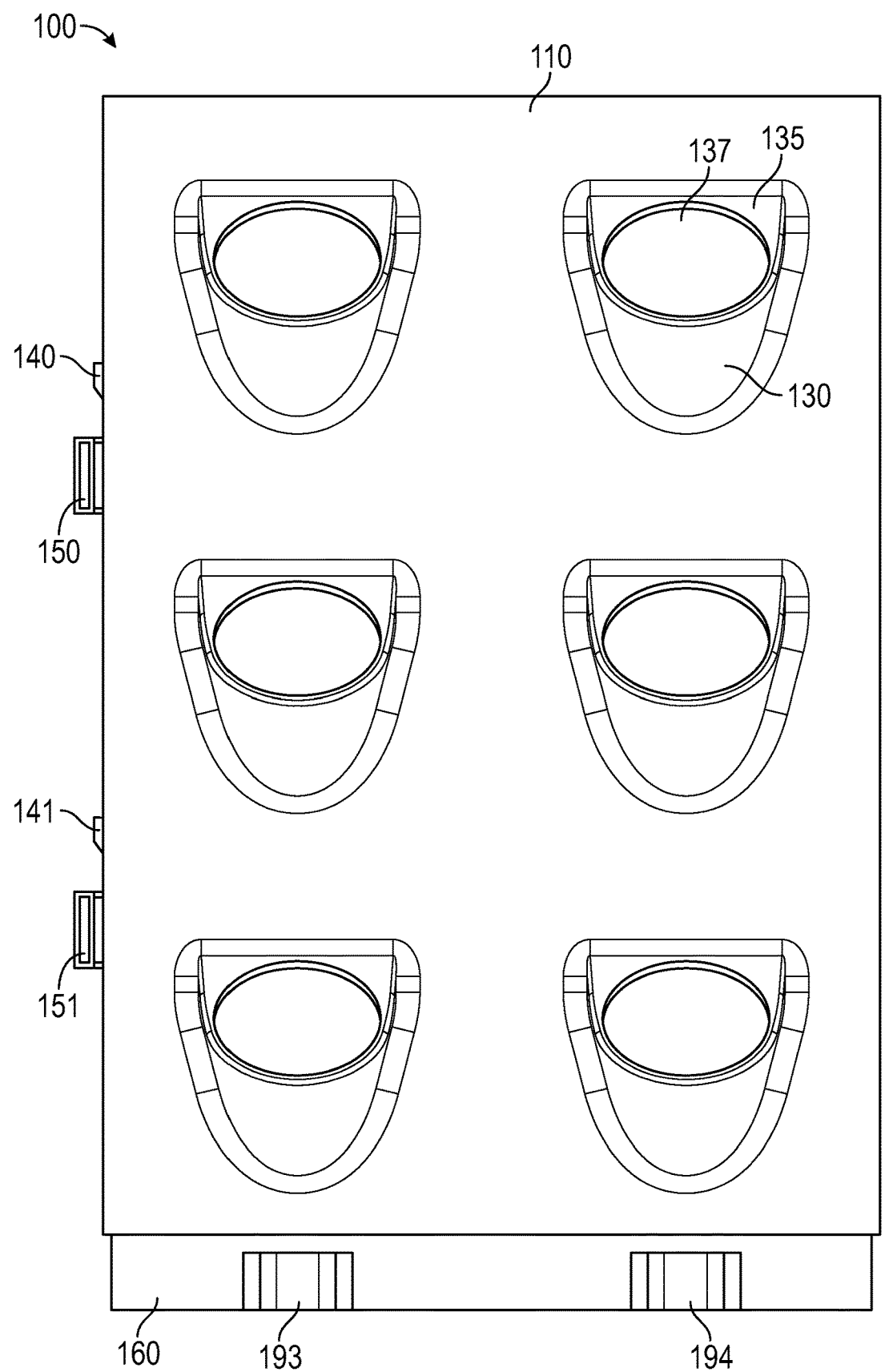
FIG. 4 is a computer-generated model of the front perspective of an embodiment of the tile of the present invention.

FIG. 4 is a front perspective view of an embodiment of the claimed tile. Tile 100 comprises tile Front 110 which displays Pot Supports 130, which Pot Supports each have a face 135. Face 135 defines a hole 137 which may optionally include a lip (not shown) which is an extension of the edge of the support towards the center of the hole 137. The lip functions to hold a pot more securely in the event the pot's diameter allows it to fall through the hole. Fillets 133 are rounded joints where the pot face support meets the tile front 110. They part of the irrigation subsystem.

Figure 5:
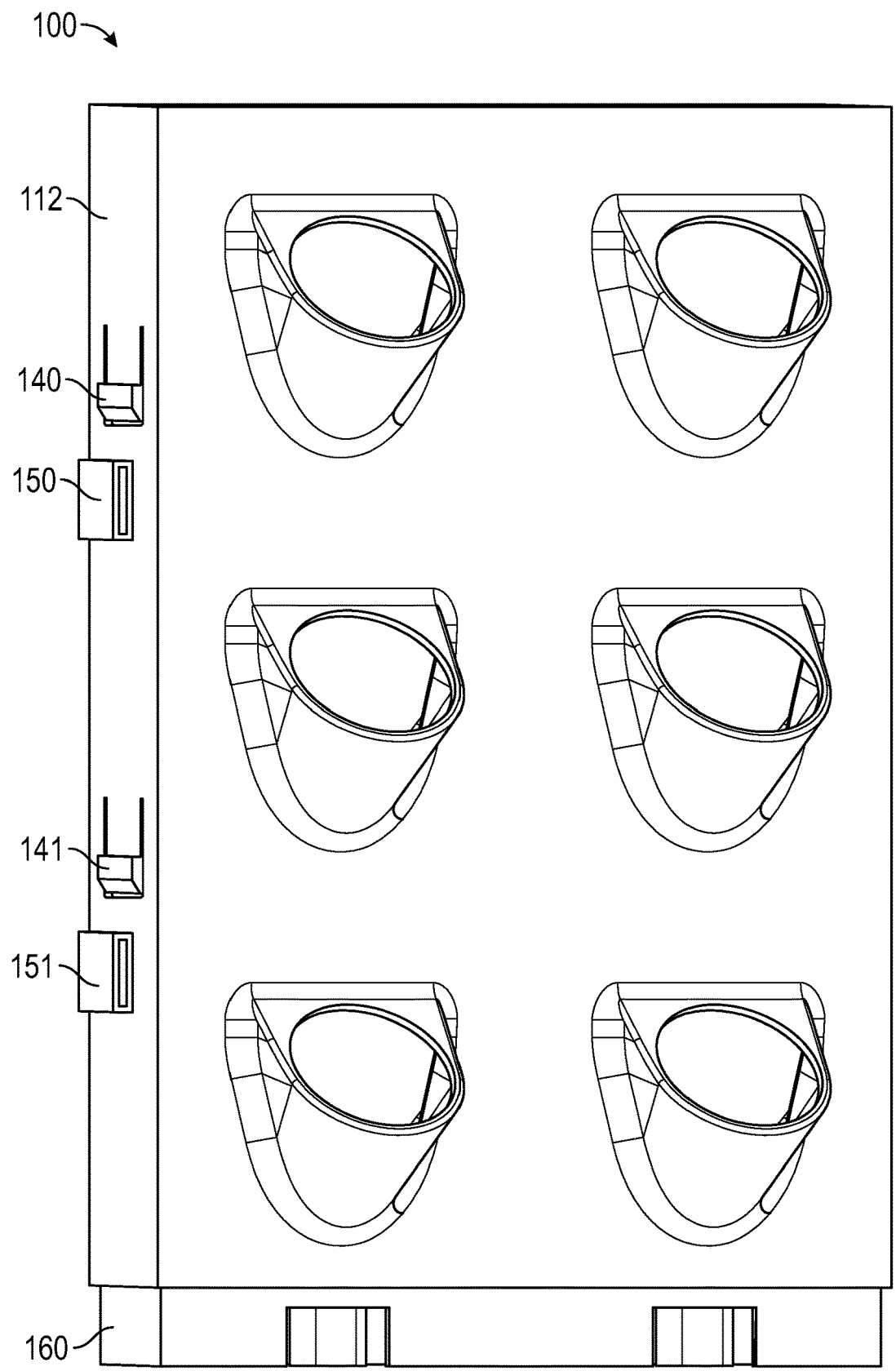
FIG. 5 is a computer-generated model showing the front left edge perspective of an embodiment of the tile of FIG. 4.
Figure 6:
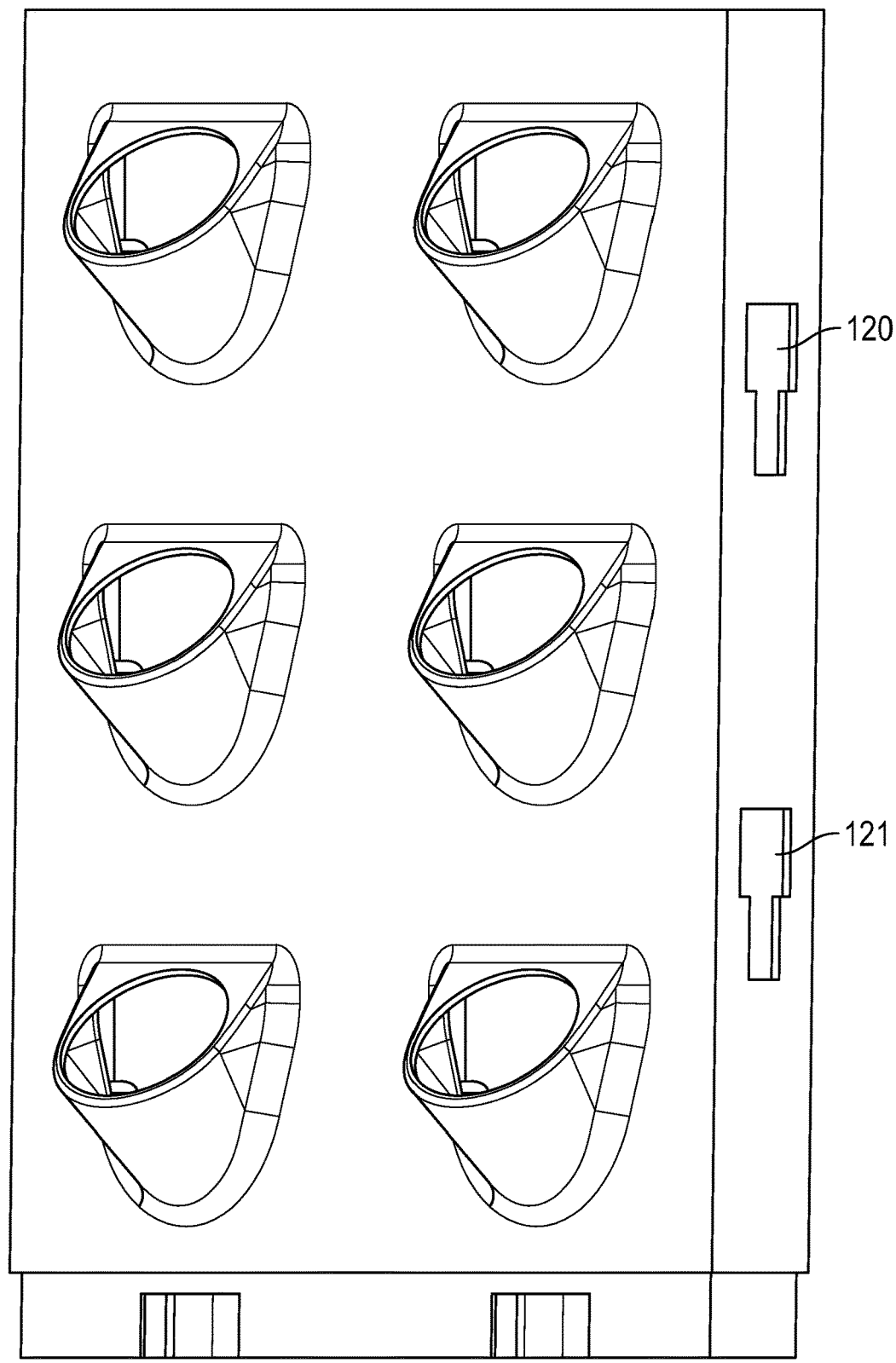
FIG. 6 is a computer-generated model of the front right edge perspective of an embodiment of the tile of FIG. 4.
Figure 7:
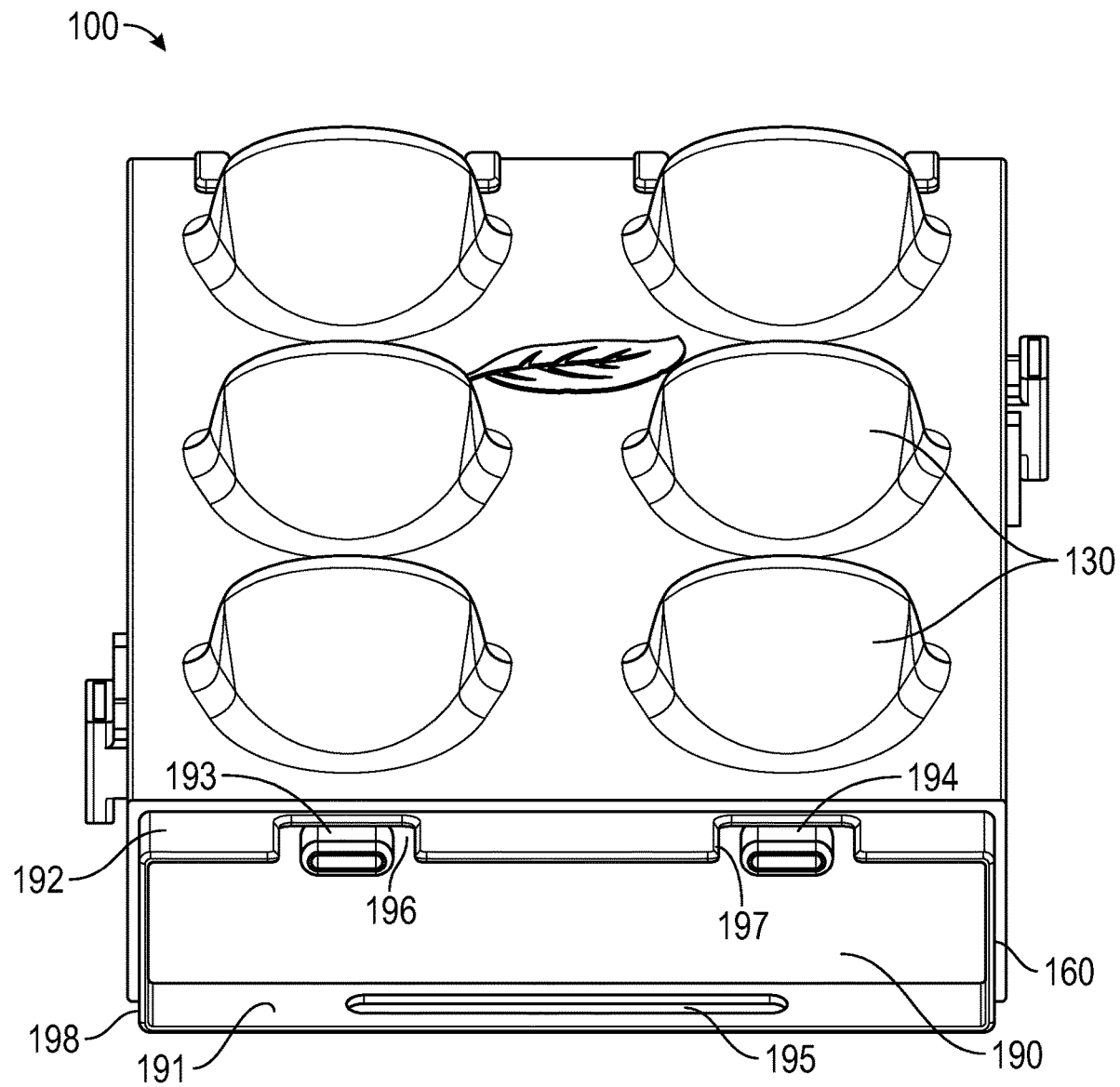
FIG. 7 is a computer-generated model depicting a partial elevational perspective of the bottom front of an embodiment of a tile of the present invention.
Figure 8:
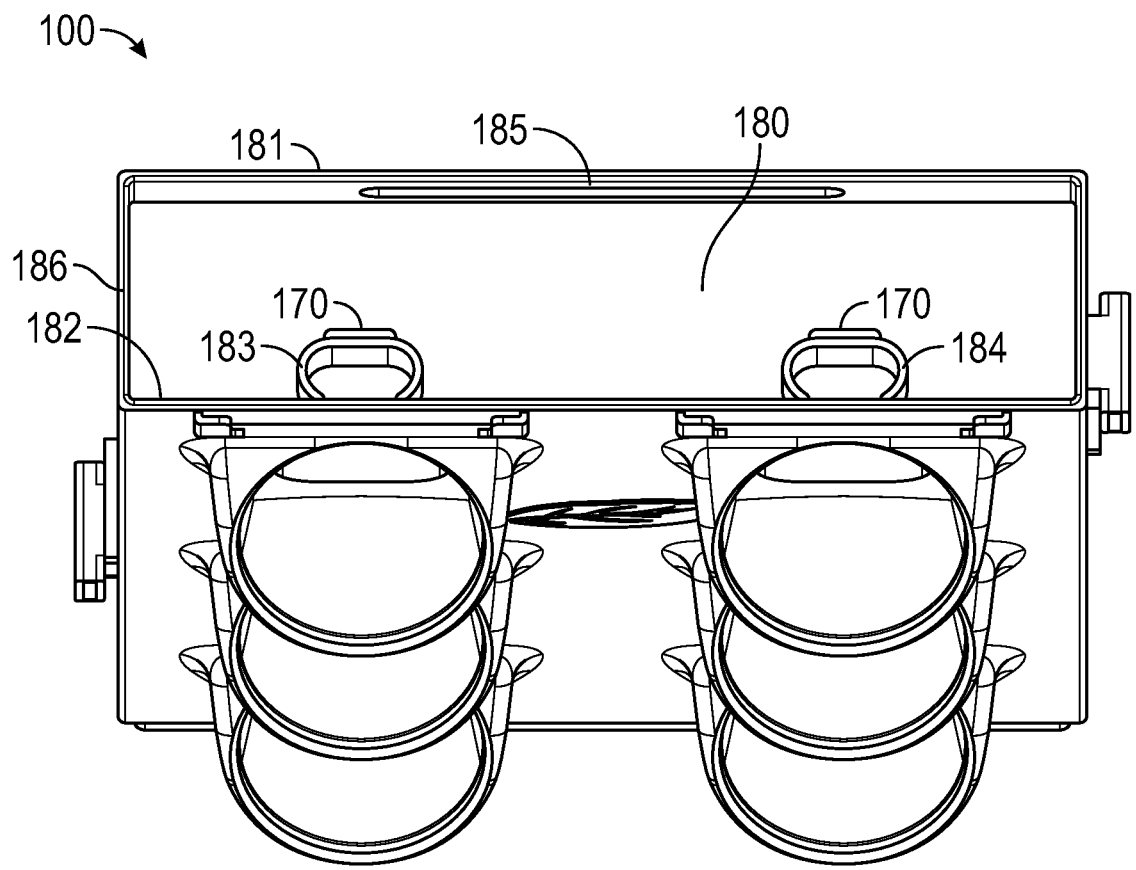
FIG. 8 is a computer-generated model depicting a partial elevational perspective of the top front of an embodiment of the tile of FIG. 7.

Tile 100 has horizontal engagement features that facilitate locking the tiles at their horizontal edge surfaces. With attention directed to FIGS. 4-5, the left edge 112 of tile 100 is featured in the perspective of FIG. 5. Edge 112 depicts upper and lower keys (150, 151) and upper and lower locking tabs (140, 141). Keys 150/151 cooperate with keyholes 120/121 (FIG. 6) to reversibly lock the tiles together at their respective edges. The keys are mushroom-shaped, i.e., each has a narrow base that supports a broad head portion. The design of each keyhole is a combination of two cutouts, an upper cutout that is large enough to accommodate the larger head portion of keys 150/151, and a lower cutout that is smaller and accomodates the narrow base portion of the key. When two tiles are held adjacent each other edge-to-edge but offset slightly in a vertical direction so that the key head from one tile can pass through the keyhole larger cutout of the adjacent tile, the two tiles may be engaged by aligning the keyheads through the upper key cutout on the opposing tile edge, and then the tiles are slid in opposite directions so their lower and upper edges are in alignment. During this aligning process the key base will slide through the smaller key cutout and the key head's lower surface will engage with the tile edge surface so that the two tiles are now constrained from further sliding motion, and are constrained against any further horizontal separation. The embodiment of FIG. 5 shows both keys and locking tabs located on the same side which implies that the adjacent tile must have two keyholes on one tile edge. Alternatively and as shown in FIGS. 7-8, there may be one key and one keyhole on the same side of a tile edge. Locking tabs 140/141 have a raised portion and a flat portion. When the tiles are aligned edge-to-edge and slid together as just described, the raised portion will depress and then snap into the narrower portion of keyhole 120/121, preventing any further vertical motion of the tiles. The tiles may be separated by simply depressing the locking tabs and vertically sliding the tile edges apart.

The tile may be made through an injection molding process. All of the features discussed herein can be designed into a mold, or alternatively could be built separately and added to a flat tile. One of ordinary skill will be able to construct the claimed features by either method. In a preferred embodiment, the tile is made from plastic, specifically PVC. Plastics resist UV radiation, mold, mildew, rust and rot and are light and inexpensive to manufacture. Other injection-moldable plastics may also be used as tile substrate, and will be well-known to those of ordinary skill in the injection-molding art.

FIGS. 7 and 8 are bottom and top isometric perspectives, respectively, of one embodiment of tile 100. FIG. 8 is a top-down perspective model of taken of the front of tile 100. Upper shelf 180 has a flat bottom. The flat bottom contains upper shelf drains 170 and upper left and right straws 183, 184 respectively. The straws are conduits that funnel water from drains 285 in irrigation flood rail 250 (see FIG. 12) down to grow pots 175 (not shown here). The straws may be built-into the shelf, or may be separately added. In a preferred embodiment they are molded into the tile shelf. Upper shelf 180 has front, rear and side walls 182, 181, 186, respectively, into which other features such as a window 185 may be located. Upper shelf 180 including its walls is adapted to receive the lower end of tile 100 via coupling extension 160 (FIG. 4). That is, the outer perimeter below lower shelf 190 is smaller in diameter so that it may nest inside of the upper shelf of a tile positioned directly above. Coupling extension 160 enables a continuation of the vertical irrigation system from the tile directly above to the next one directly below without the need for any tubing, fittings or other extraneous water conduit. It accomplishes this through engagement of the upper and lower straws when upper and lower shelfs are engaged.

FIG. 7 is a bottom-up front perspective model of tile 100. Bottom shelf 190 also has a flat bottom. The flat bottom contains lower shelf drains 170 (not shown) and lower left and right straws 193, 194 respectively. The lower straws are conduits that funnel water from the last grow pots 175 of the upper tile to the adjacent tile below. The straws may be built-into the shelf, or may be separately added. In a preferred embodiment they are molded into the tile shelf. Lower shelf 190 also has front, back and side walls 192, 191, 198, respectively, into which other features such as a window 195 may be located. Lower shelf 190 including its walls is adapted to fit into the upper shelf 180 of adjacent tile 100 through coupling extension 160, discussed above.

Figure 9:
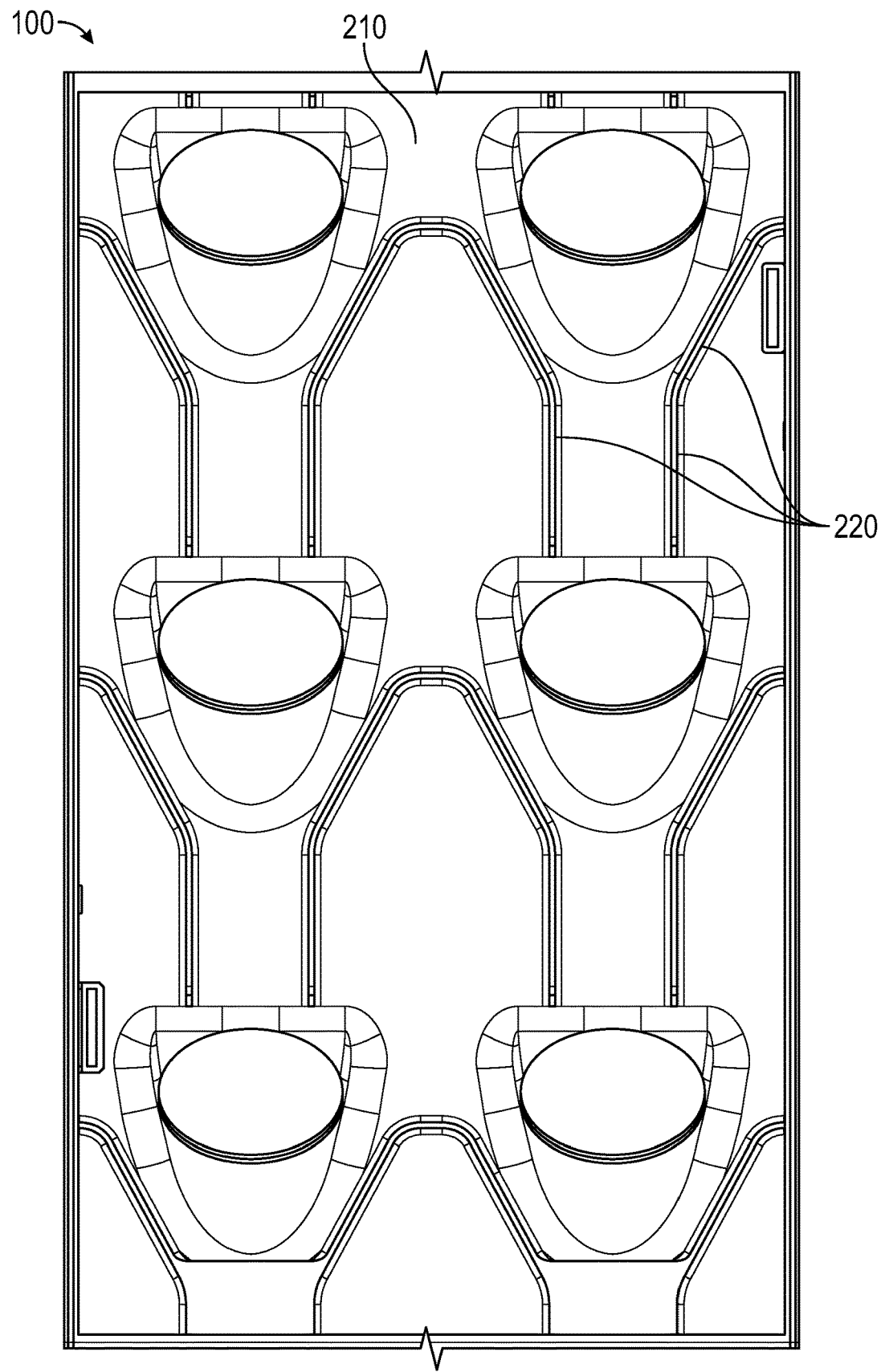
FIG. 9 is a computer-generated model depicting a back perspective of the tile of FIG. 7.
Figure 10:
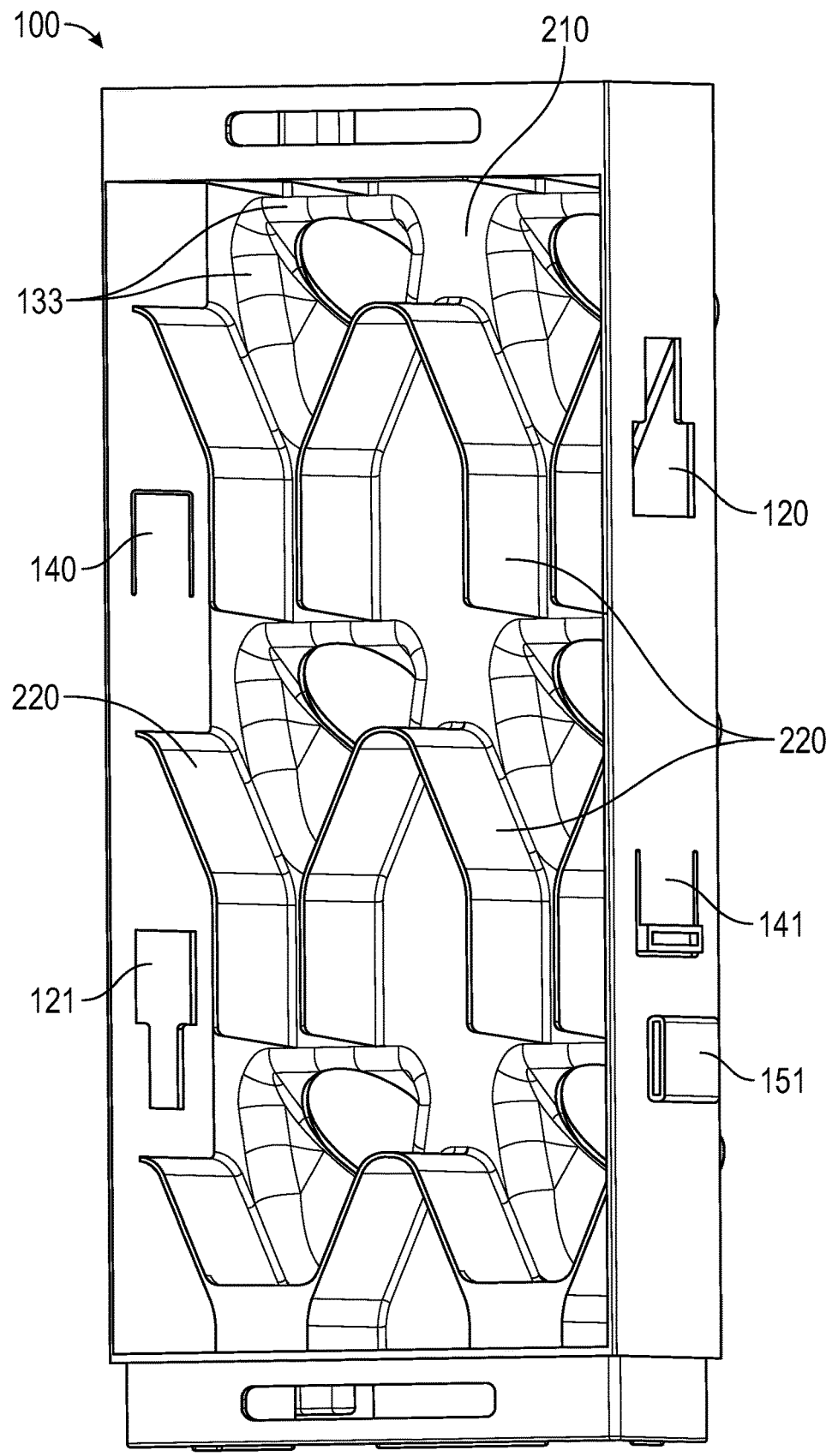
FIG. 10 is the right edge perspective of FIG. 9.

FIGS. 9 and 10 are computer-aided figures of the back perspective of an embodiment of the tile of the present invention. FIG. 9 is a straight-on view while FIG. 10 is an edge perspective view. Tile back 210 displays the water channels 220 molded into the tile. In an embodiment channels 220 are molded walls that define the path for water that cascades down from the top of tile 100 through irrigation flood rail drains 285 (FIG. 13) to and through upper shelf straws 183, 184. The water then falls directly onto the grow pots' (not shown) rear sections where the pot absorbs some of the water, and the rest flows down the pot body and into channels 220 directly below. Flow is assisted by the fillets 133 between pot supports 130 and tile back 210 thus avoiding edge-dripping and encouraging superficial flow. Since pots are arrayed vertically, the water cascades onto the next pot beneath guided by the channels. In an embodiment there are three grow pots in a linear column per tile and so the cascading water will encounter all three pots before the excess water exits the tile through lower shelf straws 193, 194. In the event of multiple tiles being stacked thereby creating columns of 6, 9, 12 or even more Grow Pots, the amount of water necessary to keep all Grow Pots wet is determined by the amount of water admitted through the irrigation flood rail 250 which is situated atop any given bank of tiles. The volume of water is in turn controlled by the automated pump controller 400.

The irrigation subsystem comprises a primary reservoir 330 with submersible pump 300 located in reservoir rail 25, a secondary reservoir 260 located in irrigation flood rail 250 above the tiles 100, tubing connecting the two reservoirs (not shown), tiles 100 with grow pots 175 therein, and an automated pumping controller 400. Submersible pump 300 may be any submersible pump capable of pumping the required volume of liquid to the desired height, and will be known to those of ordinary skill. Submersible Pump 300 is typically equipped with a float switch 310 so that the level of water in the primary reservoir 330 may be monitored by the automated pump controller 400. Primary reservoir 330 may be located in reservoir rail 25 as shown in FIGS. 1-2. Alternatively, primary reservoir 330 may be external to the overall framework so that the irrigation subsystem may contain a larger volume than can be accommodated by the reservoir rail. In yet a third embodiment an external reservoir can be combined to be in series with primary reservoir 330. This flexibility adds to the utility of this embodiment's design.

Figure 11:
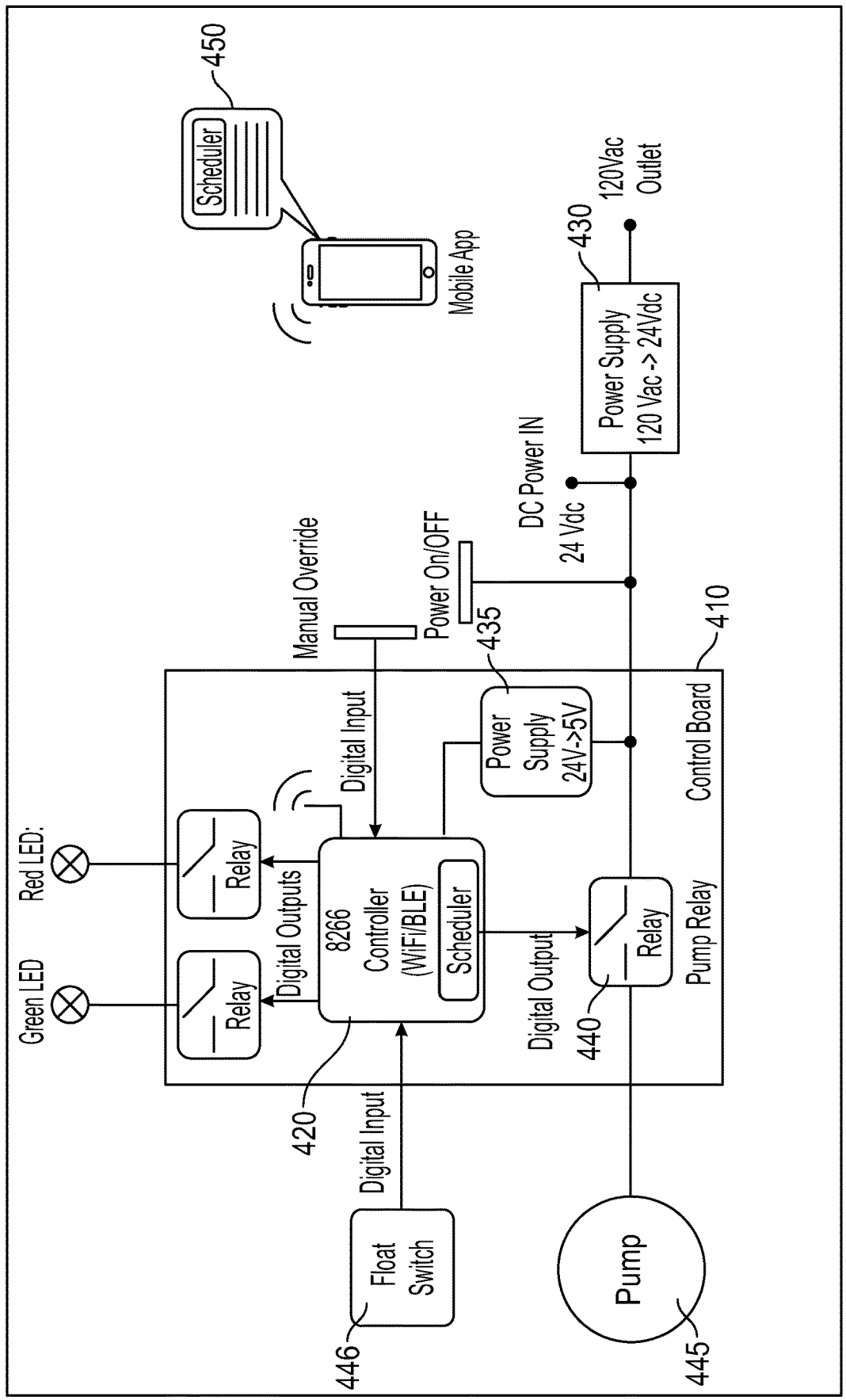
FIG. 11 is a schematic drawing of an embodiment of the automated pump control system.

Automated pump controller 400 is depicted in the schematic of FIG. 11. In an embodiment pump controller 400 comprises a control board 410, a WiFi-capable 8266 Controller chip 420, a primary power supply 430 and controller power supply 435, a pump relay 440, pump 445 with float switch 446, and a Scheduler 450. Scheduler 450 is a software application downloadable from the APPLE App Store, GOOGLE Play Store or other internet-based app storage location. Scheduler 450 resides on a mobile personal device such as a smartphone, tablet computer, or other mobile computer device that is WiFi-enabled for local near-field communication. Scheduler 450 turns pump relay 440 ON/OFF based on a user-programmable timetable that is setup via mobile app. Green and red LEDs are mounted on or in an external frame rail to notify users of irrigation system status. For example, the green LED is on whenever the 24V signal is present (board is powered); green LED is blinking when the pump is on or the manual override switch has been pressed. For the red LED, the tank full is indicated by the red LED being off; when the irrigation tank is low the pump will run one more cycle per schedule and the red LED will blink during the pump running; the red LED will be on when the pump is shut off after one schedule cycle.

Figure 12:
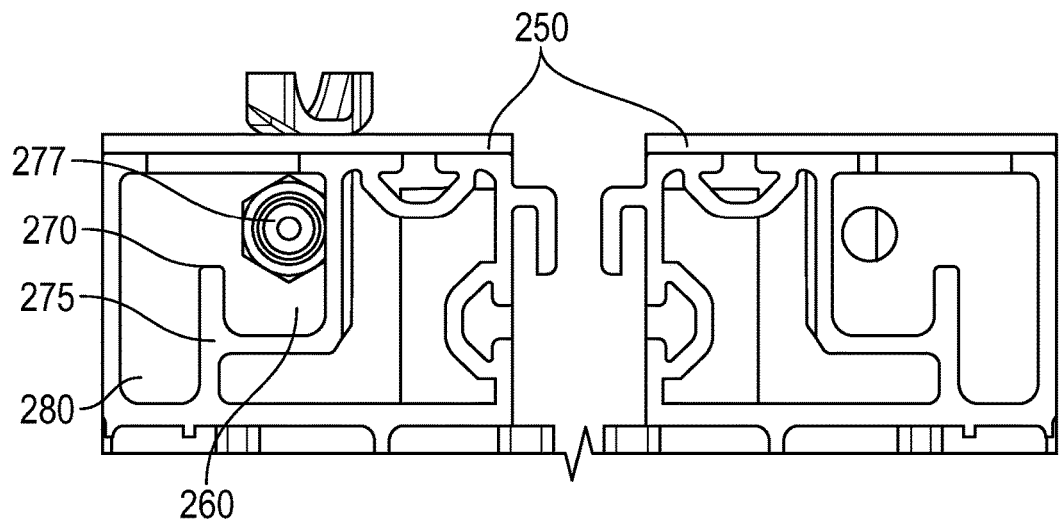
FIG. 12 is a computer-aided model cross-section of the two irrigation flood rails of two adjacent closed doors of an embodiment of the present invention.

FIG. 12 is a cross-section of two irrigation flood rails 250 from two separate doors situated back-to-back as shown in FIG. 1. The perspective is that of being at eye-level with the end of the rails and looking down irrigation flood rail 250 from one side towards the other end of the rail. With attention to the left flood rail only, as the Scheduler software turns on submersible pump 300, water is pumped into the plumbing leading up side rail 32 to emerge from secondary reservoir inflow fitting 277. If this is the first irrigation cycle, then secondary reservoir 260 is dry and needs to be filled ("primed") until its level surmounts ridge 275, which is a water barrier and also separates secondary reservoir 260 from flood compartment 280. When the water level reaches the top of ridge 275 it overflows and cascades down the front of waterfall edge 270 into flood compartment 280. Flood compartment 280 contains holes (irrigation flood rail drains 285) through the bottom of compartment 280 directly above the upper straws 183, 184 of the top tile's upper shelf 180. The embodiment of FIG. 1 depicts 12 columns of tiles per door, each tile having two irrigation flood rail drains 285 feeding its two upper straws. Secondary reservoir 260 will normally remain primed after a first filling, and so subsequent waterings will be largely instantaneous as new water enters secondary reservoir 260 it displaces water already present, which floods anew down into the tiles.

Figure 13:
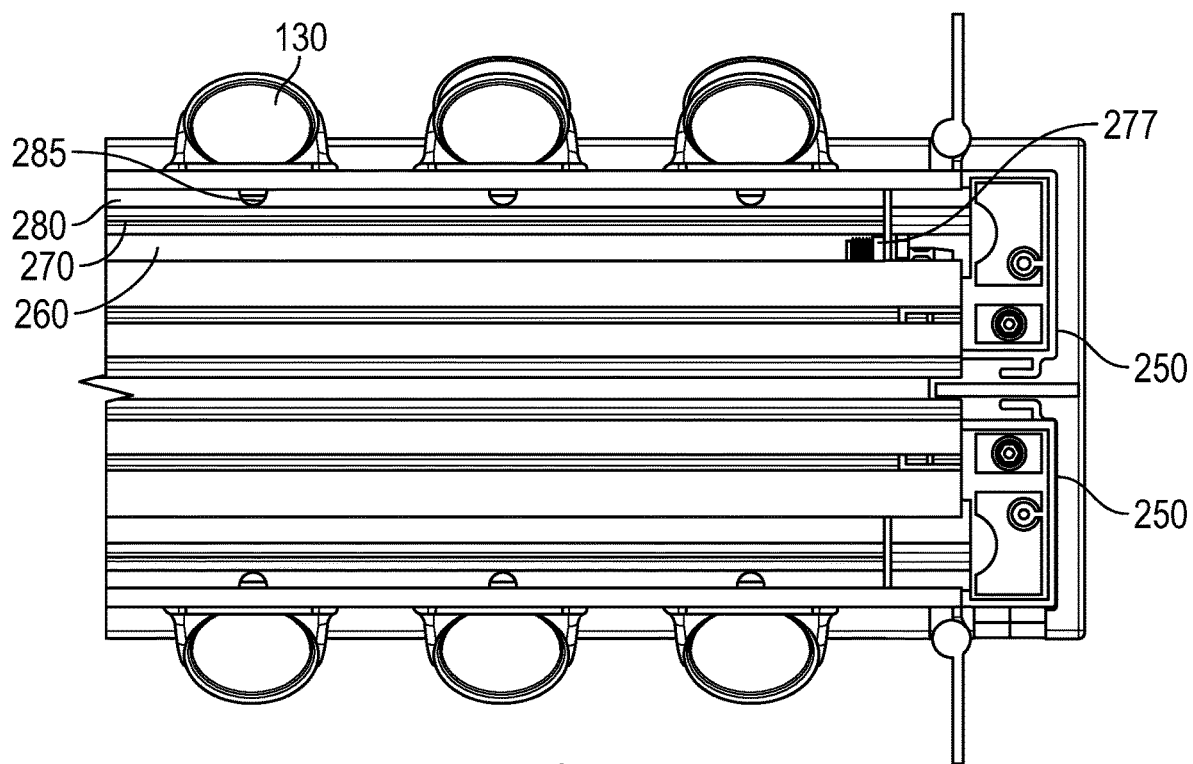
FIG. 13 is a computer-aided cross-section of the same two irrigation flood rails as shown in FIG. 12 from a top-down isometric perspective.

FIG. 13 is also a cross-section of the same two irrigation flood rails 250, this time a top-down perspective of the top corner of the external frame. The irrigation flood rail drains 285 are shown (partially occluded) in the floor of flood compartment 280, situated directly above and slightly behind pot supports 130 of the top tile.

Figure 14:
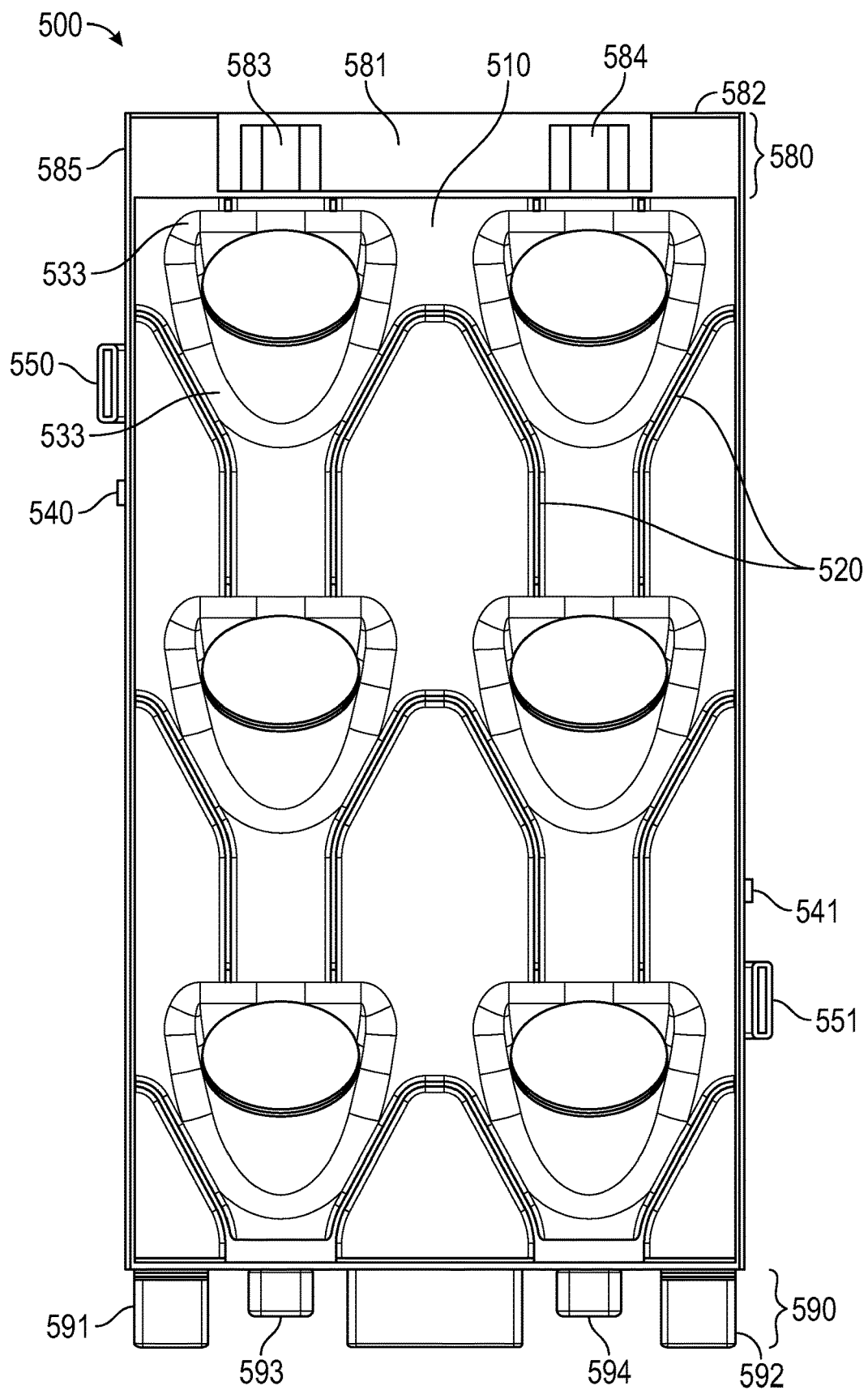
FIG. 14 is a computer-generated model depicting a rear perspective of tile 500.
Figure 15:
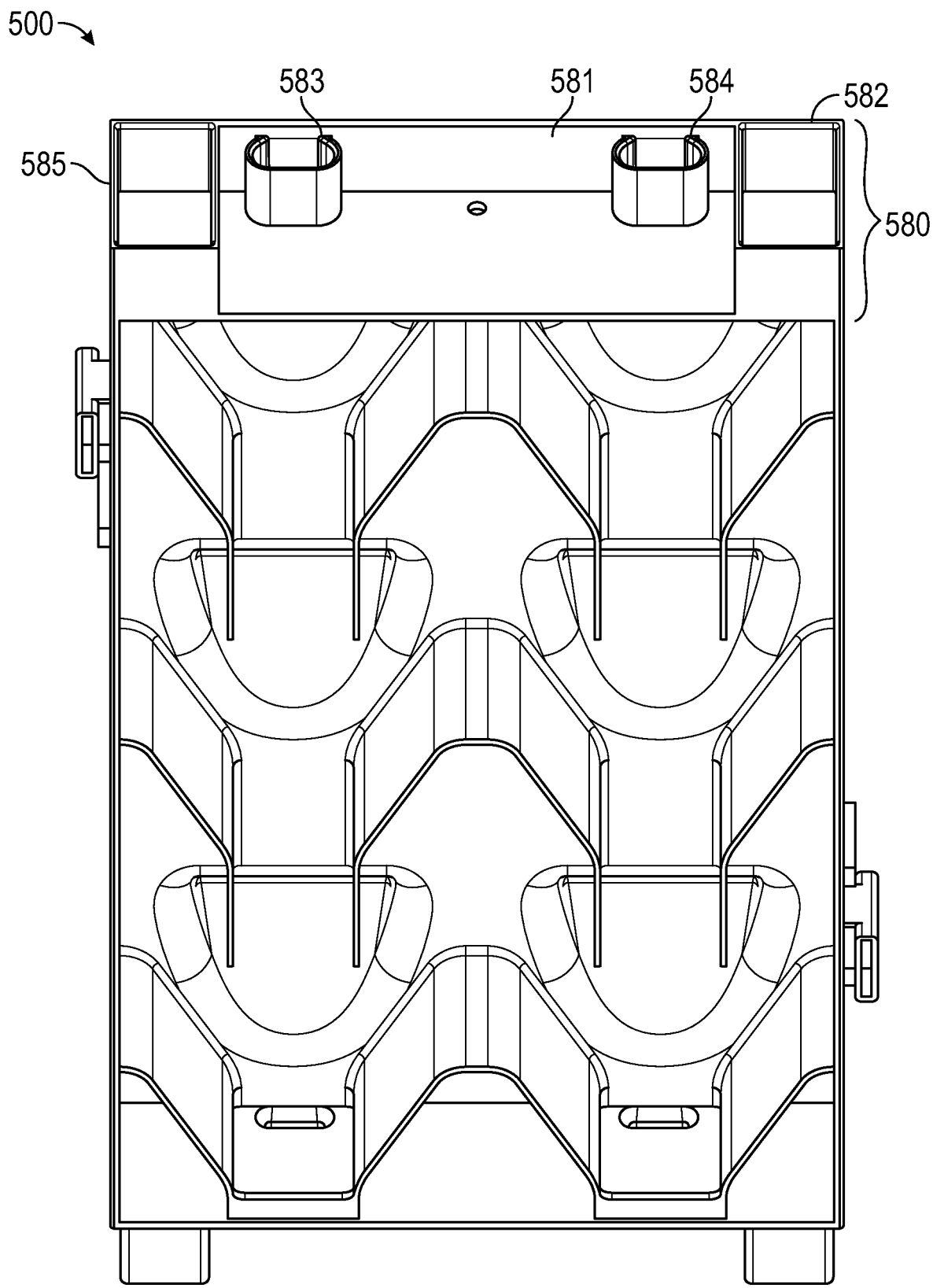
FIG. 15 is a top elevational perspective of the rear of tile 500.
Figure 16:
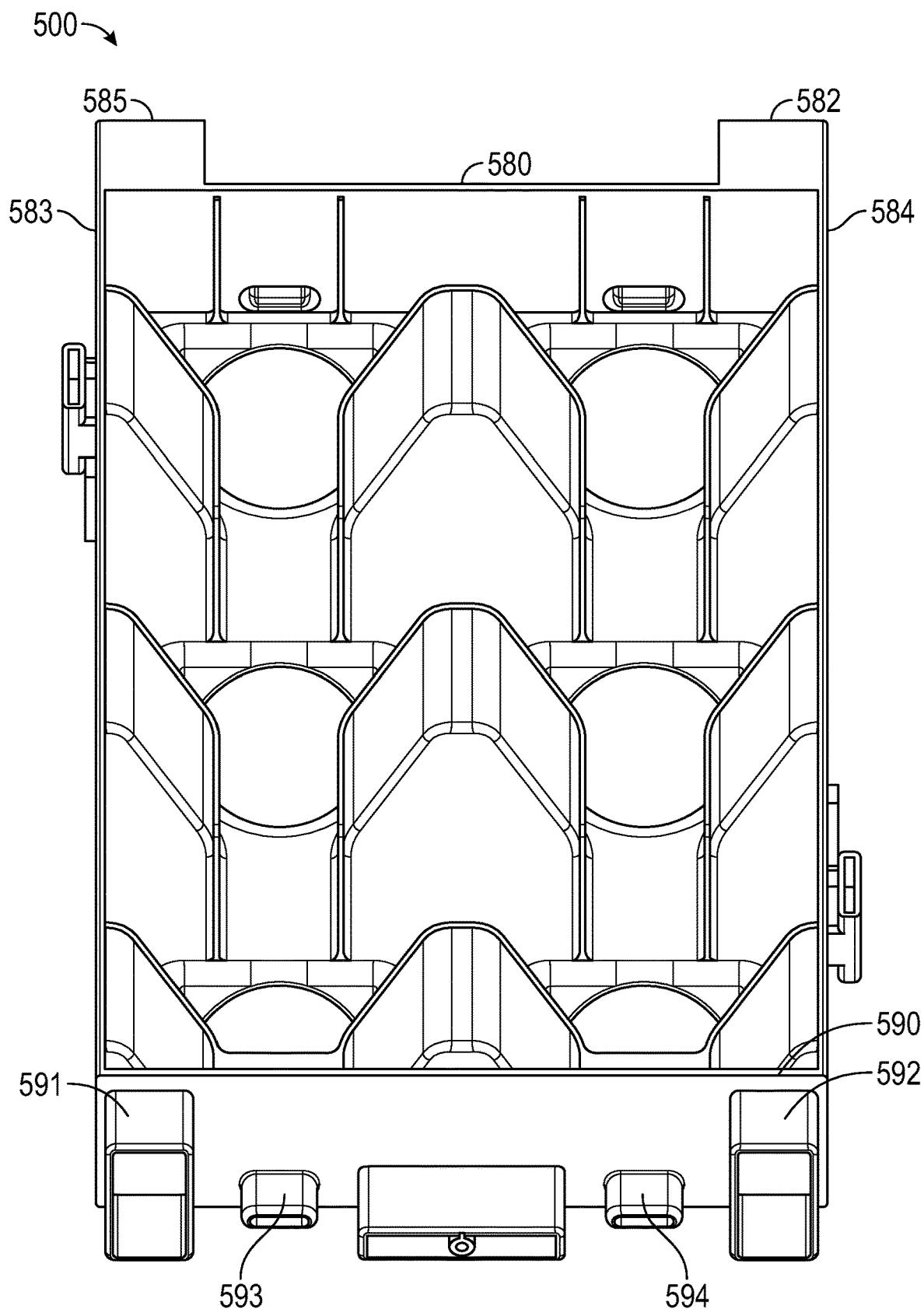
FIG. 16 is a bottom elevational perspective of the rear of tile 500.

FIGS. 14-16 are computer-generated figures of the back side of a second embodiment of the novel and inventive tile. The primary difference is that both ends of tile 500 differ from tile 100. FIG. 14 is a level perspective while FIGS. 15-16 are elevational views highlighting the ends. As in tile 100, tile back 510 displays the water channels 520 molded into the tile. In an embodiment channels 520 are molded walls that define the path for water that cascades down from the top of tile 500 through irrigation flood rail drains 285 (FIG. 13) to and through upper straws 583, 584. The water then falls directly onto the grow pots' (not shown) rear sections where the pot absorbs some of the water, and the rest flows down the pot body and into channels 520 directly below. Flow is assisted by the fillets 533 between pot supports 130 and tile back 510 thus avoiding edge-dripping and encouraging superficial flow. Since pots are arrayed vertically, the water cascades onto the next pot beneath guided by the channels. In one embodiment there are three grow pots in a linear column per tile and so the cascading water will encounter all three pots before the excess water exits the tile through lower straws 593, 594. In the event of multiple tiles being stacked thereby creating columns of 6, 9, 12 or even more grow pots, the amount of water necessary to keep all grow pots wet is determined by the amount of water admitted through the irrigation flood rail 250 which is situated atop any given bank of tiles. The volume of water is in turn controlled by the automated pump controller 400.

FIG. 15 is a computer-generated elevational perspective of upper end 580 of tile 500. Upper end 580 comprises vertical engagement features and upper straws 583, 584. The upper straws have the same function as straws 183, 184 of tile 100. Vertical engagement features or mating structures 582, 585 are right and left, respectively, sockets for accommodating posts 593, 594 from lower end 590 of a vertically adjacent tile. The posts and sockets, when aligned, function to allow for physical alignment of the tiles and therefore continuity of the vertical irrigation path from tile to tile. FIG. 16 is a computer-generated elevational perspective of lower end 590 of tile 500. As previously discussed, posts 591, 592 are designed to align with and fit inside of sockets 585, 582 of a vertically adjacent tile. In this embodiment the post-and-socket format consists of square-shaped elements, but any design that meets the required functionality is within the scope of the invention. For example, round posts and round sockets could just as well be used here. Numerous mating structures can be envisioned that allow for the alignment of the tiles at their ends, all of which are within the scope of the invention.

Embodiments of the present invention contemplate a method and system for remotely monitoring, storing, analyzing, manipulating, uploading, reporting, etc., information and data relating to the vertical hydroponic system operational data derived from raw data obtained from a plurality of sensors in an irrigation system, which may be strategically placed to gather data or information necessary for analysis or remote monitoring. Such information and data may be remotely stored, manipulated, etc., on one or more remote computer(s), and/or stored on one or more remote database(s), which may be associated with the remote computer(s). A vertical hydroponic system according to embodiments of the present invention may include any system designed or used to irrigate plants having a predetermined, desired, or preferred set of characteristics, qualities, properties, etc., for a particular application, such as, for example, a vertical hydroponic garden, a greenhouse comprising multiple vertical hydroponic systems, or networks of greenhouses located together or separated geographically.

It will be understood that various modifications may be made to the embodiments disclosed herein. Therefore, the above description should not be construed as limiting, but merely as exemplifications of preferred embodiments. Those skilled in the art will envision other modifications that come within the scope and spirit of the claims appended hereto. All patents and references cited herein are explicitly incorporated by reference in their entirety.

| FIGS. List | |
|---|---|
| No. | Part Name |
| 10 | Vertical hydroponic system |
| 20 | Support Frame |
| 25 | Reservoir rail |
| 32 | Left Side rail |
| 34 | Right Side Rail |
| 50 | Door Frame |
| 52 | Door Closing Rail |
| 54 | Door Bottom Rail |
| 56 | Door Hinge Rail |
| 100 | Tile |
| 110 | Front |
| 112 | Edge - Left |
| 120 | Keyhole (upper) |
| 121 | Keyhole (lower) |
| 130 | Pot Support |
| 133 | Fillets |
| 135 | Pot support face |
| 137 | Hole |
| 140 | Locking Tab (upper) |
| 141 | Locking Tab (lower) |
| 150 | Key (upper) |
| 151 | Key (lower) |
| 160 | Coupling extension |
| 170 | Shelf drains |
| 175 | Grow pot |
| 180 | Upper shelf |
| 181 | Upper shelf Rear Wall |
| 182 | Upper shelf Front Wall |
| 183-184 | Upper Straws (L, R) |
| 185 | Upper shelf window |
| 186 | Upper shelf side wall |
| 190 | Lower Shelf |
| 191 | Lower Shelf Rear Wall |
| 192 | Lower Shelf Front Wall |
| 193-194 | Lower Straws (L, R) |
| 195 | Lower Shelf Window |
| 196-197 | Front wall cutouts (L, R) |
| 198 | Lower shelf side wall |
| 210 | Back |
| 220 | Channels |
| 250 | Irrigation flood rail |
| 260 | Secondary reservoir |
| 270 | Waterfall edge |
| 275 | Ridge |
| 277 | Secondary Reservoir Inflow Fitting |
| 280 | Flood compartment |
| 285 | Irrigation Flood rail drains |
| 300 | Submersible Pump |
| 310 | Float switch |
| 320 | Plastic irrigation tubing |
| 330 | Primary reservoir |
| 360 | Red LED |
| 365 | Green LED |
| 400 | Automated Pump Control |
| 410 | Control board |
| 420 | WiFi-capable controller chip |
| 430 | Primary power supply |
| 435 | Controller Power Supply |
| 440 | Pump relay |
| 445 | Pump |
| 446 | Float Switch |
| 450 | Scheduler |
| 500 | Tile |

-continued

FIGS. List

| No. | Part Name |
|---|---|
| 510 | Back |
| 520 | Channels |
| 533 | Fillets |
| 540 | Locking Tab (upper) |
| 541 | Locking Tab (Lower) |
| 550 | Key (Upper) |
| 551 | Key (Lower) |
| 580 | Upper End |
| 581 | Upper End Rear Wall |
| 582 | Right Socket |
| 583-584 | Upper Straws (L, R) |
| 585 | Left Socket |
| 590 | Lower End |
| 591-592 | Posts (L, R) |
| 593-594 | Lower Straws (L, R) |

We claim:

1. A tile for vertical hydroponic farming comprising:
a) a substrate comprising front and back surfaces forming a tile, the tile oriented vertically when in use and having one or more pot supports for supporting grow pots, the one or more pot supports comprising an angled integral projection with an opening from the tile front surface adapted to support a grow pot inserted through the opening, the tile back surface comprising integral channels that direct a flow of water in a vertical direction to and past the rear portion of the grow pots that project through the tile rear surface;
b) tile horizontal engagement features located on the edges of the tiles whereby the tiles may be releasably locked to other tiles in a 2-dimensional array resulting in a user-designable tile wall; and
c) tile vertical engagement features comprising an upper end and a lower end, each end comprising mating structures and upper and lower straws, the mating structures and straws adapted to engage with the opposite mating structure from another tile when individual tiles are vertically engaged, and the upper straws direct water from an irrigation flood rail located directly above each column of grow pots to the channels that direct the water to each grow pot when water is admitted from above.

2. The tile of claim 1 wherein the angled projection is angled approximately 45 degrees from horizontal when the tile is oriented vertically, the precise angle being sufficient to support a grow pot inserted through the opening.

3. The tile of claim 1 wherein the angled projection optionally comprises a lip on its front surface for restraining a grow pot from slipping through the opening.

4. The tile of claim 1 wherein the plurality of projections are centered on a vertical line thereby creating a column of grow pots.

5. The tile of claim 1 wherein the projections are arranged in a 2×3 array.

6. The tile of claim 1 wherein the projections are adapted to fit standard-sized peat pots.

7. The tile of claim 1 wherein the horizontal engagement features comprise integral keyholes, keys and locking tabs.

8. The tile of claim 1 wherein the mating structures comprise posts and sockets adapted to fit together and stabilize adjacent tiles vertically.

9. A vertical hydroponic system comprising:
a) a plurality of the tiles of claim 1 arranged in a vertical hydroponic wall;
b) a support frame defining the periphery of the hydroponic wall, the top frame rail comprising an irrigation flood rail having a plurality of water outlets, a bottom rail comprising a primary reservoir rail for water that drains from above, and two side rails providing lateral rails for attaching tiles to the support frame;
c) conduits for connecting the primary reservoir with the irrigation flood rail;
d) pumping means for moving water from the primary reservoir to the irrigation flood rail;
e) stabilization means attached to and supporting the support frame in a freestanding condition; and
f) automated pump control means for providing power to and control of the pump.

10. The vertical hydroponic system of claim 9 wherein the conduits connecting the reservoir with the irrigation flood rail comprise plastic tubing.

11. The vertical hydroponic system of claim 9 wherein the irrigation flood rail comprises a secondary reservoir, a waterfall edge and a flood compartment.

12. The vertical hydroponic system of claim 11 wherein the waterfall edge comprises a ridge that separates the secondary reservoir from the flood compartment.

13. The vertical hydroponic system of claim 9 wherein the stabilization means comprises a reservoir rail.

14. The vertical hydroponic system of claim 9 wherein the automated pump control means comprises a computerized scheduler programmed to perform various hydroponic functions comprising watering at timed intervals, adding various fertilizers or nutrients to the water, detecting various chemicals in the water through sensors, and providing remote communication capability.

15. The vertical hydroponic system of claim 14 wherein the remote communication capability comprises a wireless connection to a mobile handheld computing device.

16. The vertical hydroponic system of claim 9 wherein the automated pump control means comprises an control board comprising a power supply, two or more differently colored LEDs, a pump relay, float switch, WiFi-capable controller and a scheduler.

17. The automated pump control means of claim 16 wherein the scheduler comprises programmable code that resides in a mobile handheld computing device.

18. The vertical hydroponic system of claim 16 wherein the automated pump control means is remotely accessible through the internet.

* * * * *